United States Patent [19] [11] 4,152,955
McWhorter [45] May 8, 1979

[54] ENGINE COMPOUND CRANKSHAFT

[76] Inventor: Edward M. McWhorter, 6931 Greenbrook Cir., Citrus Heights, Calif. 95610

[21] Appl. No.: 628,917

[22] Filed: Nov. 5, 1975

Related U.S. Application Data

[63] Continuation-in-part of Ser. No. 538,019, Jan. 2, 1975, Pat. No. 3,957,338.

[51] Int. Cl.[2] ............ A01K 7/00
[52] U.S. Cl. ............ 74/602; 123/78 E; 123/78 F; 123/48 B
[58] Field of Search ............ 123/78 E, 78 F, 48 B, 123/197 AC; 74/601, 602

[56] References Cited

U.S. PATENT DOCUMENTS

| | | | |
|---|---|---|---|
| 460,642 | 10/1891 | Kitson | 74/602 X |
| 537,637 | 4/1895 | Hanlon | 123/78 F |
| 564,577 | 7/1896 | Altham | 123/197 AC |
| 1,207,429 | 12/1916 | Morison | 123/78 F |
| 1,964,096 | 6/1934 | Tucker | 74/602 |
| 2,090,841 | 8/1937 | Jones | 74/601 X |
| 2,241,378 | 5/1941 | Evans | 123/48 B X |
| 2,369,747 | 2/1945 | Munn | 74/602 X |
| 3,686,972 | 8/1972 | McWhorter | 123/48 B X |
| 3,861,239 | 1/1975 | McWhorter | 123/48 B X |

FOREIGN PATENT DOCUMENTS

| | | | |
|---|---|---|---|
| 28700 | 6/1907 | Austria | 123/78 F |
| 379257 | 1/1922 | Fed. Rep. of Germany | 123/78 F |
| 23585 | 12/1921 | France | 123/78 F |
| 593732 | 8/1925 | France | 123/78 F |
| 16669 of | 1907 | United Kingdom | 123/48 B |

*Primary Examiner*—Benjamin W. Wyche
*Assistant Examiner*—Don E. Ferrell

[57] ABSTRACT

This invention relates to new and useful improvements in the mechanism comprising the crankshaft of internal or external combustion engines and also for use in other externally heated closed vapor cycle systems. In the engine system presented an eccentric is placed between the connecting rod and crankpin and is made to rotate with each revolution of the crankshaft by use of eccentric gearing. Rotation of the eccentric augments the simple harmonic motion induced by rotation of the crankpin thus changing the reciprocating motion of the piston in a manner which improves the efficiency of the mechanical conversion process.

5 Claims, 7 Drawing Figures

ENGINE COMPOUND CRANKSHAFT

CROSS REFERENCE

This application is a continuation-in-part of my co-pending application Ser. No. 538,019 "Engine Inertial Crankshaft", filed Jan. 2, 1975 and now U.S. Pat. No. 3,957,338.

BACKGROUND OF THE INVENTION

1. Field of the Invention

In the engine system presented an eccentric is placed between the crankpin and connecting rod and is made to rotate by a system of eccentrically mounted gears. The rotation of the eccentric upon the crankpin, synchronized in conjunction with the crankshaft revolution, produces a compound crank motion which is sometimes referred to in the literature as a cycloidal crank system. The rotation of the eccentric augments the simple harmonic reciprocating motion induced by rotation of the crankpin and thus effects piston speed. Because of the added complexity of mechanism, and its attendant effect on piston motion, this type of engine is classified as an advanced reciprocating engine system.

2. Description of Prior Art

In all previous disclosures of engines of this type, the eccentric is made to rotate upon the crankpin by a system of gearing in which a stationary gear is fixedly attached to the engine block and by an emeshed planetary gear rotatably mounted in the crank arm. In this invention the stationary gear is fixedly attached to the crank arm.

SUMMARY OF THE INVENTION

The invention is a crankshaft to be used in the piston driven internal or external combustion engine or in other types of externally heated vapor cycle engines. In the system presented an eccentric is placed between the crankpin and connecting rod and is caused to rotate by a system of eccentrically mounted gears. Rotation of the eccentric causes the connecting rod to be raised and lowered upon the crankpin in a manner synchronized with the revolution of the crankshaft. The additional motion of the connecting rod augments the simple harmonic motion of the piston induced by rotation of the crankpin and therefore introduces an additional degree of freedom in the reciprocating process. It is therefore the object of the present invention to provide in a manner as hereinafter setforth a crankshaft of the aforementioned character comprising a means of controlling piston motion within some measure relative to the uniform speed of the crankpin and thereby allowing combustion, or hot vapor expansion, to proceed in a manner which is more conductive to efficient mechanical conversion.

It is yet another object of the invention to present a crankshaft design in which the crank radius is extended during the power stroke and retracted during the return stroke thus increasing the net rotative effort.

All of the foregoing and still further objects and advantages of the invention will become apparent from a study of the following specification and drawings presented.

BRIEF DESCRIPTION OF THE DRAWINGS

There are presented as part of the specification drawings which show the crankshaft and parts of the reciprocating assembly comprising the invention.

DESCRIPTION OF THE PREFERRED EMBODIMENT

Figure 1:
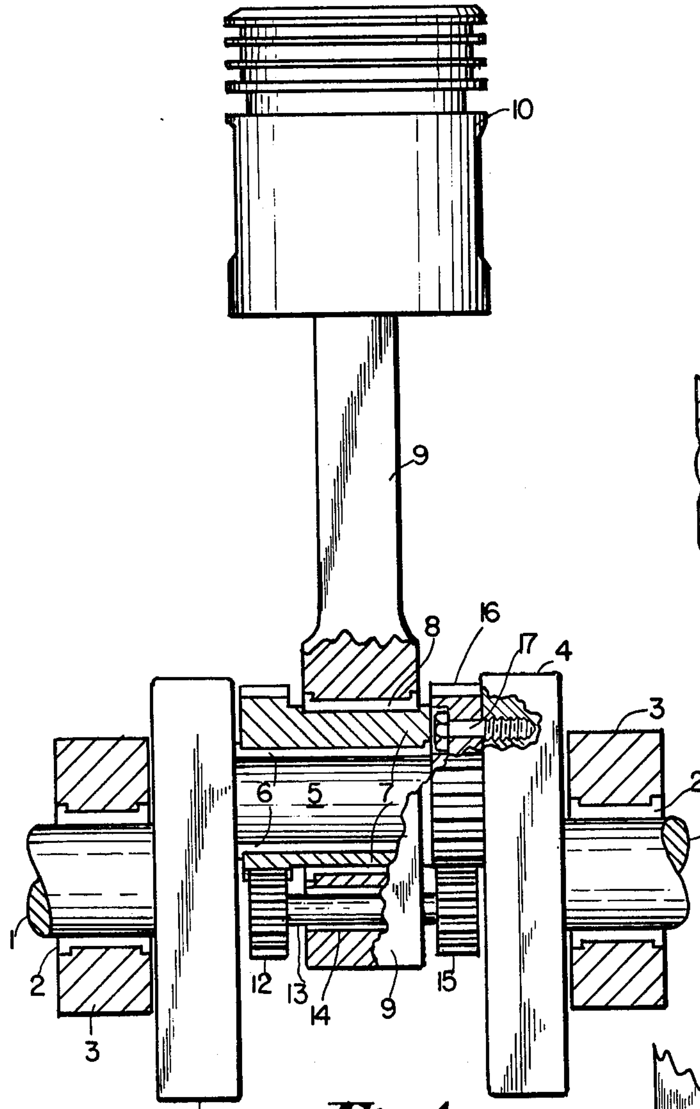
FIG. 1 is a side view of a crank throw showing the eccentrically mounted gearing and associated crankpin components principally in cross-section and also showing the connecting rod and piston assembly.

Referring now to the drawings in detail and to FIG. 1 thereof in particular. FIG. 1 is a side view of a crank-throw and also shows an attached connecting rod and piston comprising the reciprocating portion of the assembly. Main bearing shafts 1 are rotatably mounted in main journal bearings 2 which are mounted in engine block 3. Each main bearing shaft 1 is fixedly attached to arms 4 which are in turn fixedly attached to each other by a crankpin 5 thus forming a crankthrow of a crankshaft having a plurality of such crankthrows. In the discussion which follows, all of the other crank throws depicted in the various Figures presented, shall be of this exact type and therefore their elements shall be designated by the same numerals. Eccentric 7 is rotatably mounted upon bearing 6 which is in turn mounted upon crankpin 5. Bearing 8 is rotatably mounted on eccentric 7. Connecting rod 9 is mounted on bearing 8 at the lower end and pivotally attached to piston 10 at the upper end. Gear 11, shown in cross-section, is fixedly attached to eccentric 7, such that its geometric center coincides with the geometric center of eccentric 7. Therefore in reference to the rotation of gear 11 relative to the axial center of crankpin 5, it is eccentrically mounted. Since its geometric center coincides with the geometric center of eccentric 7, its corresponding eccentricity, relative to the axial center of crankpin 5, is therefore the same as that of eccentric 7. Idler gear 12 engages gear 11. Idler gear 12 is fixedly attached to shaft 13 which is journalled in bearing 14 which is mounted in the lower end of the connecting rod 9. Gear 15 is fixedly attached to the other end of shaft 13 and is emeshed with gear 16 which is fixedly attached to arm 4 by bolts 17. Gear 16 is attached to arm 4 such that its geometric center also coincides with the geometric center of gear 11 and eccentric 7.

When shaft 1 is rotated, gear 16 is also rotated since both components are fixedly attached to arm 4. The rotation of gear 16 causes idler gear 15 to rotate which in turn rotates idler gear 12 through shaft 13. The rotation of idler gear 12 causes emeshed gear 11 and attached eccentric 7 to rotate on crankpin 5. The rotation of eccentric 7 on crankpin 5 causes connecting rod 10 to be raised and lowered upon crankpin 5 and thus to this degree augments the simple harmonic motion resulting from the rotation of the fixed crank radius of crankpin 5. The relative motion induced by rotation of eccentric 7 on crankpin 5 is transferred through connecting rod 9 to piston 10 and thus influences the normal compression and expansion rates of the working fluid above the piston. It is also seen that the crank radius varies in a cyclic manner which also influences the rotative effort in a manner which is proportional to the change in the crank radius moment arm. For maximum efficiency the moment arm should be extended during the expansion cycle and retracted during the compression cycle.

Figure 2:
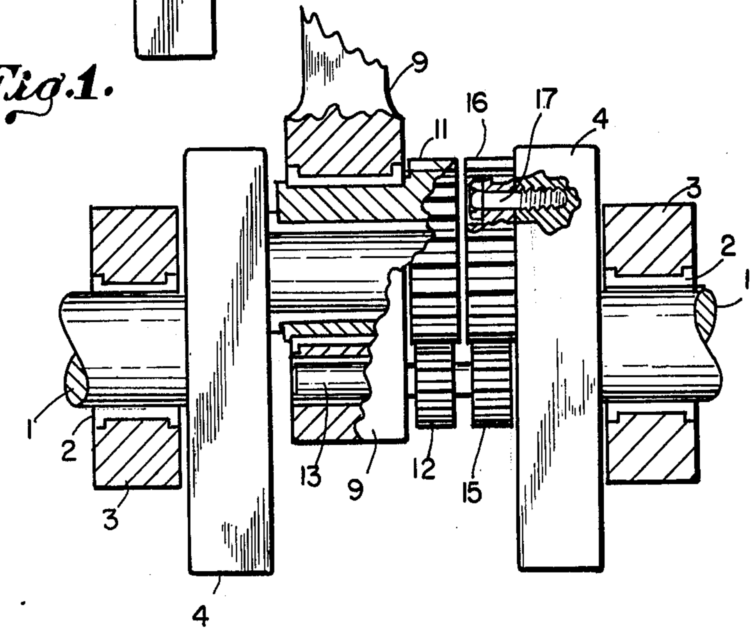
FIG. 2 is a side view of the system shown in FIG. 1 illustrating an alternate method of positioning the gearing.

Turning now to FIG. 2. Eccentric 7 and fixedly attached gear 11 can be remounted on crankpin 5 such that it is now adjacent to gear 16 as shown in FIG. 2. In this arrangement gear 12 and gear 15 are therefore correspondingly mounted at the same end of shaft 13 as shown. The synergism is the same as that described for FIG. 1. The only difference between the two systems shown is in the fact that all of the gearing is mounted on one side of connecting rod 9 in FIG. 2 while in FIG. 1 the gearing was mounted on both sides of the connecting rod.

Figure 3:
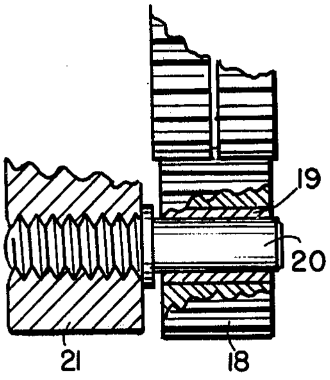
FIG. 3 is a detail of the idler gear showing an alternate method of construction and mounting.

Turning now to FIG. 3 which is a detailed drawing of the idler gears showing an alternate method of mounting. It can be seen in FIG. 2 that idler gears 12 and 15 can be fabricated as a single elongated gear presented in FIG. 3 as gear 18. Idler gear 18 would contain bearing 19 which in turn is rotatably mounted on shaft 20 which is fixedly attached to connecting rod 21.

Figure 4:
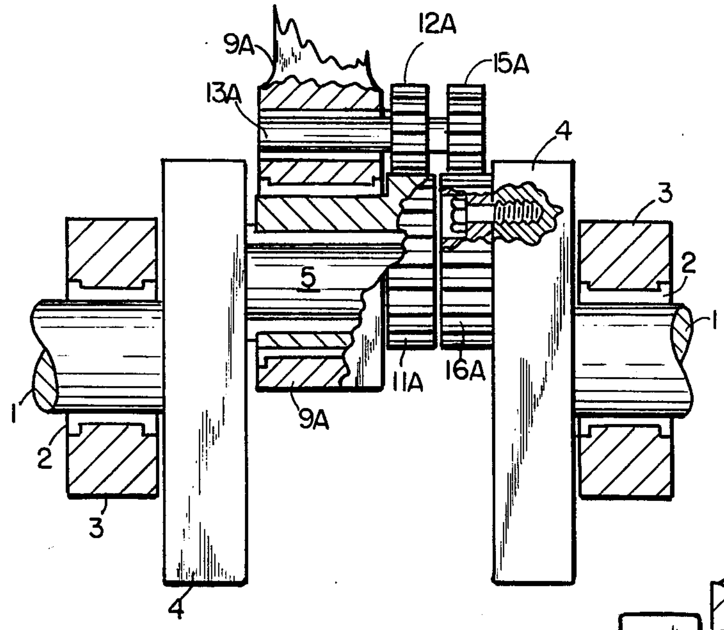
FIG. 4 is a side view of a crank throw showing an alternate location of the idler gears on the connecting rod.

Turning now to FIG. 4. In the preceding discussion idler gears 12, 15 and 18, of FIGS. 2 and 3 respectively, were shown mounted on the lower end of the connecting rod which is in most engines designated as the connecting rod bearing cap. As shown in FIG. 4 the idler gears, designated as idler gears 12A and 15A, may also be mounted in upper main portion of the connecting rod. In fact the idler gears may be rotatively mounted on any portion of the connecting rod 9A which will permit their correct engagement with the eccentrically mounted gears 11A and 16A. Therefore in the remaining portion of the specification the idler gears shall be referred to as simply rotatably mounted on the connecting rod.

Figure 5:
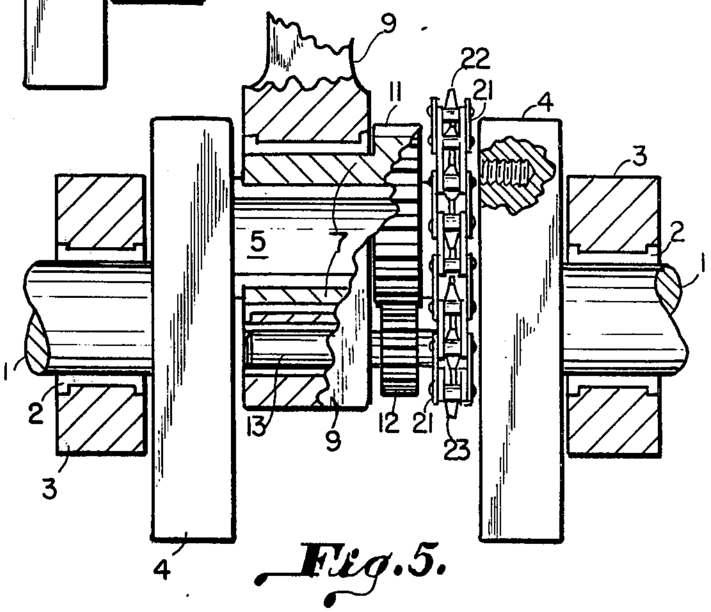
FIG. 5 is a side view of a crank throw showing an alternate method of imparting motion to the eccentric using a chain and sprocket combination.

Turning now to FIG. 5 which shows a chain and sprocket arrangement used to drive the same type of system presented in FIG. 2. Since a rubber composite gear belt could be used in place of the chain and sprocket system shown the chain shall hereinafter be referred to as a chain/belt. By using chain belt 21 as shown in FIG. 5 the direction of rotation of eccentric 7, relative to the clockwise revolution of shaft 1, is reversed from that of FIGS. 1, 2 and 4.

The mechanism of FIG. 5 operates as follows. Chain/belt 21 is mounted upon sprockets 22 and 23. Sprocket 22 replaces gear 16 of FIG. 2. Sprocket 22 is fixedly attached to arm 4 and indirectly engages sprocket 23 by chain/belt 21. Sprocket gear 23 is fixedly attached to shaft 13 which is rotatably mounted in connecting rod 9. Idler gear 12 is also fixedly attached to shaft 13 and emeshes with gear 11 as in the case of FIGS. 1 and 2. Rotation of shaft 1 induces rotation of eccentric 7 as previously described but in this instance the direction of rotation of eccentric 7 is reversed because of the indirect engagement of sprockets 22 and 23. Sprockets 22 and 23 are of the same ratio as idler gear 12 and gear 11. Sprocket gear 22 is mounted on arm 4 such that its geometric center coincides with the geometric center of eccentric 7. It would be apparent to those only casually skilled in the art to recognize the fact that idler gear 12 and gear 11 could likewise be replaced by a chain and sprocket combination.

Figure 6:
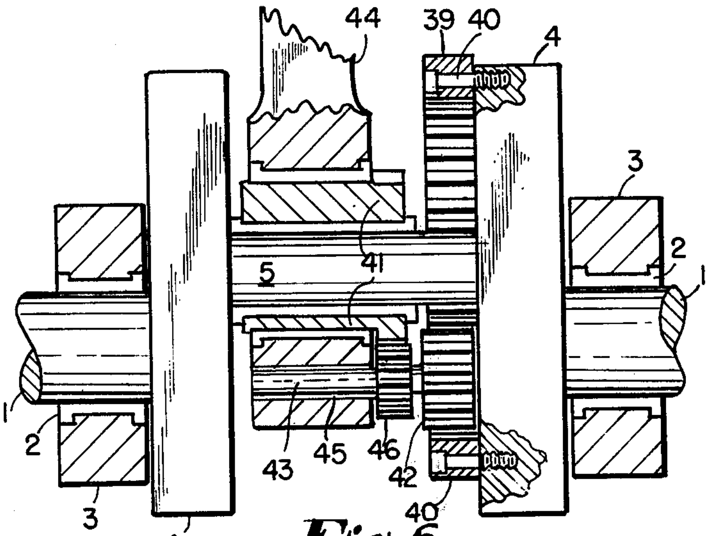
FIG. 6 is a side view of a crank throw showing the use of a stationary internal tooth gear.

Turning now to FIG. 6 showing yet another gearing arrangement. Internal tooth gear 39 is fixedly attached to arm 4 by bolts 40. Internal gear 39 is eccentrically mounted on arm 4 relative to the axial center of crankpin 5. The degree of eccentricity of internal tooth gear 39 is the same as that of eccentric 41. Idler gear 42 is emeshed with internal toothed gear 39 and is fixedly attached to shaft 43 which is in turn rotatively mounted in connecting rod 44, in bearings 45. A second idler gear 46 is also fixedly attached to shaft 43. Idler gear 46 is emeshed with gear 47 which is fixedly attached to eccentric 41. As previously shown the rotation of shaft 1 will also cause the gears to rotate eccentric 41.

Figure 7:
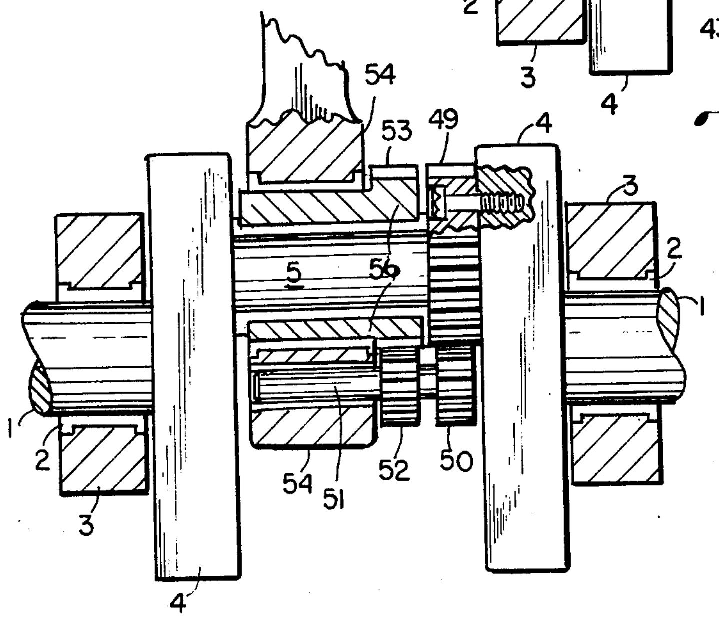
FIG. 7 is a side view of a crank throw showing the use of elliptic gearing.

Turning now to FIG. 7 which shows the use of elliptic gears working in conjunction with eccentric gearing. Elliptic gear 49 is fixedly attached to arm 4. Idler gear 50 is emeshed with elliptic gear 49. Elliptic gear 49 has twice as many teeth as the idler gear 50. Idler gear 50 is fixedly and eccentrically mounted on shaft 51. The second idler gear 52 is emeshed with elliptic gear 53 which is identical with elliptic gear 49. Both elliptic gears 49 and 53 are mounted such that their geometric centers coincide with the axial center of crankpin 5. Elliptic gear 53 is fixedly attached to eccentric 56. As in previous cases the rotation of shaft 1 will cause the subsequent rotation of eccentric 56 through the entrainment of the gear system shown.

What is claimed is:

1. An engine block, a plurality of longitudinally aligned main bearings in said engine block, longitudinally spaced main bearing shafts journaled in said main bearings, arms fixed on the adjacent ends of said main bearing shafts, a crankpin joining adjacent said arms forming a crankthrow of a crankshaft having a plurality of such crankthrows, a gear fixedly mounted on one of the said arms, said gear being positioned eccentrically upon said arm relative to the axial center of said crankpin, said gear being emeshed with an idler gear, said idler gear being fixedly attached to one end of a shaft, said shaft being rotatively mounted in a connecting rod, a second idler gear being fixedly attached to said shaft, said second idler gear being emeshed with a second gear, said second gear fixedly attached to an eccentric, the geometrical center of said gear being axially aligned with the geometrical center of the said eccentric, said eccentric being rotatively mounted on said crankpin said connecting rod rotatively mounted on said eccentric at one end and pivotally joined to a piston at the other end.

2. An engine block, a plurality of longitudinally aligned main bearings in said engine block, longitudinally spaced main bearing shafts journaled in said main bearings, arms fixed on the adjacent ends of the said main bearing shafts, a crankpin joining adjacent said arms forming a crankthrow of a crankshaft having a plurality of such crankthrows, an eccentrically mounted gear fixedly attached to one of said arms, said gear being engaged with an idler gear, said idler gear being fixedly attached to a second idler gear, the said idler gear and said second idler gear are rotatively mounted on a connecting rod, said second idler gear being engaged with a second gear, said second gear being fixedly attached to an eccentric, said eccentric being rotatively mounted on said crankpin, said connecting rod rotatively mounted on said eccentric at one end and pivotally joined to a piston at the other end.

3. The invention of claim 2 in which the said eccentrically mounted gear is fixedly attached to one arm of the said adjacent pair of arms, said gear being directly engaged with said idler gear, said idler gear being fixedly attached to said second idler gear, said idler gear and said second idler gear being mounted on a shaft, said shaft being rotatively mounted on said connecting rod, said second idler gear being engaged with said second gear, said second gear being fixedly attached to an eccentric, said eccentric being rotatively mounted on said crankpin, a connecting rod rotatively mounted on said eccentric at one end and pivotally joined to a piston at the other end.

4. The invention of claim 2 in which the said eccentrically mounted gear is an internally toothed gear fixedly attached to one arm of said adjacent pair of arms, said internal toothed gear being emeshed with said idler gear, said idler gear being fixedly attached to said second idler gear, said idler gear and said second idler gear being mounted on a shaft, said shaft being rotatively mounted on said connecting rod, said second idler gear being engaged with said second gear, said second gear being fixedly attached to an eccentric, said eccentric being rotatively mounted on said crankpin, a connecting rod rotatively mounted on said eccentric at one end and pivotally joined to a piston at the other end.

5. The invention of claim 2 in which the said gear is an elliptical gear fixedly attached to one arm of the said adjacent pair of arms, an idler gear emeshed with said elliptic gear, said idler gear is positioned eccentrically on a shaft and fixedly attached thereon, said shaft rotatively mounted in a connecting rod, a second idler gear eccentrically positioned on said shaft and fixedly attached thereon, said second idler gear emeshed with a second elliptical gear, said second elliptical gear fixedly attached to said eccentric, said eccentric being rotatively mounted on said crankpin, said connecting rod rotatively mounted on said eccentric at one end and pivotally joined to a piston at the other end.

* * * * *